(12) United States Patent
Puhalla et al.

(10) Patent No.: US 8,548,722 B2
(45) Date of Patent: Oct. 1, 2013

(54) TILT SENSOR AND METHOD FOR DETERMINING THE TILT OF A VEHICLE

(75) Inventors: Jeffrey S. Puhalla, Hawley, MN (US); Nikolai R. Tevs, Fargo, ND (US)

(73) Assignee: Deere & Company, Moline, IL (US)

( * ) Notice: Subject to any disclaimer, the term of this patent is extended or adjusted under 35 U.S.C. 154(b) by 218 days.

(21) Appl. No.: 13/208,414

(22) Filed: Aug. 12, 2011

(65) Prior Publication Data

US 2013/0041577 A1   Feb. 14, 2013

(51) Int. Cl.
| G01C 9/00 | (2006.01) |
| B63B 9/08 | (2006.01) |
| G06F 7/00 | (2006.01) |

(52) U.S. Cl.
USPC .......................... 701/124; 701/29.1; 702/154

(58) Field of Classification Search
USPC ............... 701/29.1, 32.9, 33.1, 33.4, 33.7, 701/124; 702/151, 154; 73/65.01
See application file for complete search history.

(56) References Cited

U.S. PATENT DOCUMENTS

| 5,797,111 | A  | * | 8/1998  | Halasz et al. ................. 701/103 |
| 6,600,985 | B2 |   | 7/2003  | Weaver et al. |
| 6,983,583 | B2 |   | 1/2006  | Bucher |
| 7,222,007 | B2 |   | 5/2007  | Xu et al. |
| 7,529,640 | B2 | * | 5/2009  | Fujiwara ....................... 702/151 |
| 7,650,252 | B2 | * | 1/2010  | Douglas ........................... 702/95 |
| 2002/0165654 | A1 | * | 11/2002 | Weaver et al. .................. 701/45 |
| 2005/0149240 | A1 | * | 7/2005  | Tseng et al. .................... 701/38 |
| 2008/0319589 | A1 | * | 12/2008 | Lee et al. ......................... 701/1 |
| 2009/0024354 | A1 | * | 1/2009  | Osaki et al. ................... 702/154 |
| 2009/0138232 | A1 | * | 5/2009  | Fuwa et al. ................... 702/154 |
| 2010/0168946 | A1 | * | 7/2010  | Snyder ............................ 701/22 |
| 2010/0191408 | A1 | * | 7/2010  | Boylston et al. ............... 701/29 |
| 2010/0256887 | A1 |   | 10/2010 | Linda et al. |
| 2010/0268508 | A1 | * | 10/2010 | Bongers et al. ............... 702/141 |
| 2011/0119942 | A1 |   | 5/2011  | Jiang |

FOREIGN PATENT DOCUMENTS

| FR | 2932878 A1 | * | 12/2009 |
| WO | 0201151 A1 |   | 1/2002 |

OTHER PUBLICATIONS

STMicroelectronics, Tilt measurement using a low-g 3-axis accelerometer, Apr. 2010.*
LI Wen-liang, YI Zhen-guo, Zhou Wei, Zhu Ying, Liu Jia-xin, Vehicle Rollover Dynamic Monitoring based on Tilt Sensor, IEEE, 2010.*
Kimberly Tuck, Tilt Sensing Using Linear Accelerometers, Freescale Semiconductor, Application Note, AN3461, Rev 2, Jun. 2007, 4 pages.
The International Search Report and the Written Opinion of the International Searching Authority, Nov. 20, 2012 (10 pages).

* cited by examiner

*Primary Examiner* — Fadey Jabr
*Assistant Examiner* — Thomas Ingram (57) ABSTRACT

A tilt sensor and method comprises a first accelerometer for measuring a first acceleration level associated with a first axis of the vehicle. A second accelerometer measures a second acceleration level associated with a second axis of the vehicle that is generally perpendicular to the first axis. A data processor is capable of determining an arcsine-derived tilt based on an arcsine equation and the determined first acceleration level. The data processor is capable of determining an arccosine-derived tilt based on an arccosine equation and the determined second acceleration level. The data processor comprises a selector for selecting the arcsine-derived tilt as the final tilt of the vehicle if the determined arcsine-derived tilt is lesser than the determined arccosine derived tilt such that the final tilt compensates for vertical acceleration associated with changes in the terrain in the direction of travel of the vehicle.

24 Claims, 4 Drawing Sheets

TILT SENSOR AND METHOD FOR DETERMINING THE TILT OF A VEHICLE

FIELD OF THE INVENTION

This invention relates to a tilt sensor and a method for determining the tilt of a vehicle.

BACKGROUND OF THE INVENTION

Certain prior art tilt sensors may not adequately address error in tilt measurements from one or more of the following factors: acceleration associated with centripetal force, acceleration in the direction of travel, or vertical acceleration associated with climbing or descending sloped terrain. For example, some prior art tilt sensors may determine erroneous tilt angles for vehicles because transient centripetal force (e.g., turning) and acceleration in the direction of travel (e.g., starting or stopping) skew accelerometer measurements that are used to estimate the tilt angle. Accordingly, there is a need for a sensor or sensing method for determining the tilt of a vehicle to compensate for the above factors to achieve accurate and reliable tilt estimates.

SUMMARY OF THE INVENTION

In accordance with one embodiment, a tilt sensor and method comprises a first accelerometer for measuring a first acceleration level associated with a first axis of the vehicle. A second accelerometer measures a second acceleration level associated with a second axis of the vehicle that is generally perpendicular to the first axis. The second axis is generally aligned with or coincident with a vertical axis of the vehicle. A data processor is capable of determining an arcsine-derived tilt based on an arcsine equation and the determined first acceleration level. The data processor is capable of determining an arccosine-derived tilt based on an arccosine equation and the determined second acceleration level. The data processor comprises a selector for selecting the arcsine-derived tilt as the final tilt of the vehicle if the determined arcsine-derived tilt is lesser than the determined arccosine derived tilt such that the final tilt compensates for vertical acceleration associated with changes in the terrain (e.g., slope of the terrain) in the direction of travel of the vehicle.

DESCRIPTION OF THE PREFERRED EMBODIMENT

Figure 1:
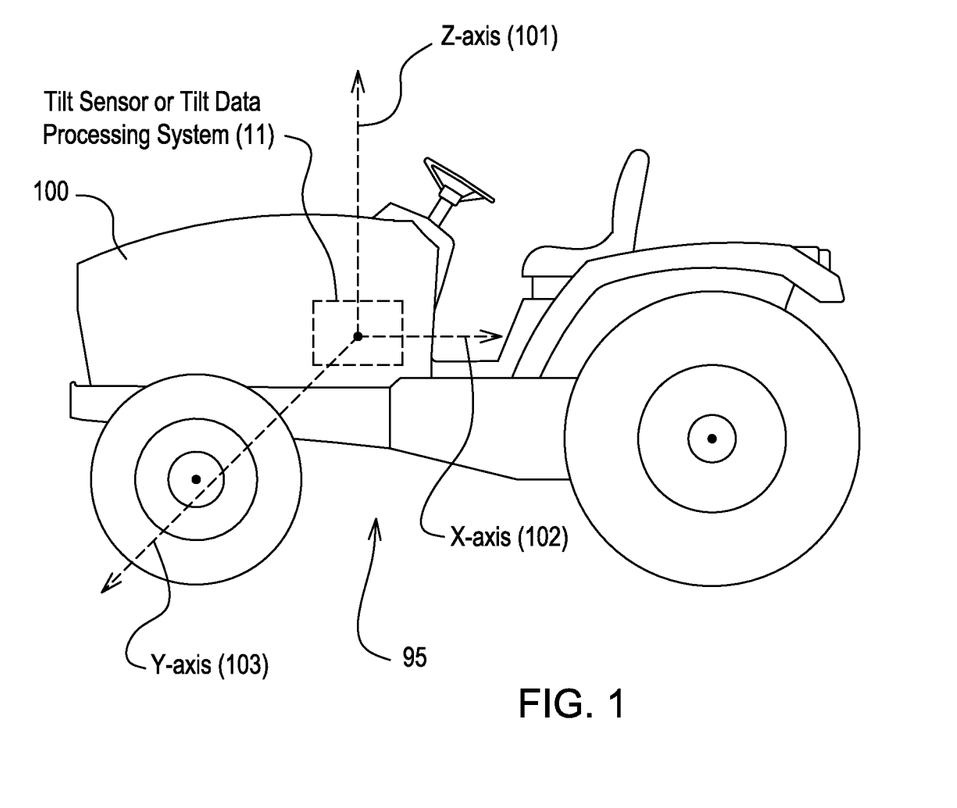
FIG. 1 illustrates a side view of the vehicle with a tilt sensor that shows the relative axes associated with the vehicle.

FIG. 1 is a side view of an illustrative vehicle 95 equipped with a tilt sensor 11 or tilt data processing system, which is indicated by dashed lines as installed on the vehicle with reference to axes (100, 101, 103). As used in this document, in one embodiment the tilt sensor 11 comprises the tilt data processing system. The tilt sensor 11 has its accelerometer(s) or acceleration sensors (e.g., gyroscopes) oriented or aligned with the axes, as described later in more detail. As illustrated, the axes are based on a Cartesian coordinate system and include an X-axis 100, a Y-axis 103, and a Z-axis 101. The X-axis 100, the Y-axis 103 and the Z-axis 101 are mutually orthogonal to each other. In one embodiment as illustrated in FIG. 1, the X-axis 100 is primarily coincident with a direction of forward (and reverse) travel of the vehicle 95, the Y-axis 103 is primarily coincident with a direction of lateral movement of the vehicle 95, and the Z-axis 101 is primarily coincident with a direction of vertical movement of the vehicle 95. Without any limitation imposed by the illustrative example of FIG. 1, other orientations of the X-axis 100, a Y-axis 103, and a Z-axis 101 with respect to the vehicle 95 fall within the scope of the claims.

The tilt of the vehicle may be expressed as an attitude, an angle or a compound angle with reference to one or more of the axes. Attitude may be defined as pitch, roll and yaw, collectively, for example. If the attitude or tilt of the vehicle 95 is considered in two or more dimensions or with reference to two or more axes, the tilt may be defined in terms of one or more of the following: pitch, roll, yaw, a pitch angle, a roll angle, and a yaw angle. Each pitch, roll or yaw angle may be measured with reference to a corresponding axis (X, Y, or Z axis).

Although the tilt, roll or pitch can be determined based on one-axis measurements (e.g., X-axis or Y-axis) of an accelerometer, multi-axis measurements (e.g., X-axis and Y-axis) of accelerometers oriented along different axes generally provide more accurate estimates of tilt over a greater angular range and without any angular ambiguity that might otherwise result from a sine function-determined tilt with reference to one-axis. Further, one-axis measurements of an accelerometer may merely provide roll, pitch or a one-dimensional tilt, as opposed to a multi-dimensional attitude or tilt.

The vehicle 95 may comprise any tractor, truck, automobile, combine, mower, agricultural equipment, construction equipment, forestry equipment, turf-care equipment, or mining equipment, regardless of whether the vehicle is equipped with tracks or wheels. In alternate embodiments, the vehicle may comprise a ship, barge, vessel, watercraft, an aircraft, airplane, helicopter, or another conveyance for transporting items or persons.

Figure 2:
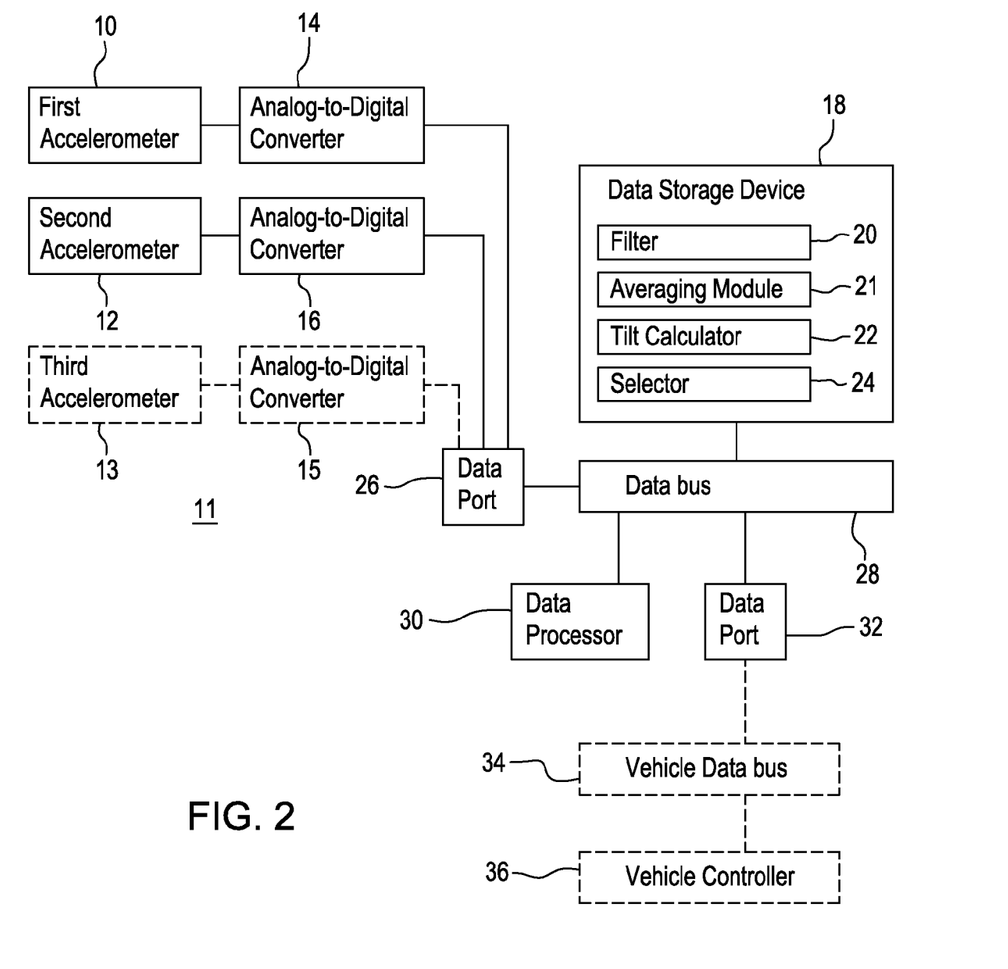
FIG. 2 is a block diagram of a sensor or data processing system for sensing a tilt of a vehicle.

The tilt sensor 11 or system of FIG. 2 comprises at least a first accelerometer 10 and a second accelerometer 12. In an alternate embodiment, the tilt sensor 11 may comprise three accelerometers (10, 12 and 13), where each accelerometer is aligned to measure acceleration along a corresponding axis (e.g., X-axis, Y-axis, and Z axis) of the vehicle 95. As shown in FIG. 2, the optional third accelerometer 13 and corresponding analog-to-digital converter 15 of the alternate embodiment is shown in dashed lines.

In the example of FIG. 2, the first accelerometer 10 is coupled to an analog-to-digital converter 14; the second accelerometer 12 is coupled to an analog-to-digital converter 16. In turn, the analog-to-digital converters (14, 16) are coupled to a data port 26. The data processor 30, the data storage device 18, and data ports (26, 32) are coupled to the data bus 28. The data processor 30 is capable of communicating with one or more data ports (26, 32) or the data storage device 18 via the data bus 28.

The data storage device 18 contains program instructions or software modules for controlling operation of the data processor 30. As illustrated in FIG. 2, the data storage device 18 comprises a filter 20, an averaging module 21, a tilt calculator 22 and a selector 24. The filter 20 comprises one or more of the following items: (1) a low pass filter for attenuating high frequency noise in the sample (e.g., above two times the sampling frequency), (2) a low pass filter for attenuating high frequency noise in the outputted or selected final tilt angle, (3) digital filter, (4) an exponential filter, and (5) an infinite impulse response filter. The averaging module 21 comprises a statistical analysis module, a weighting module or software instructions for averaging acceleration measurements over time, such as a first acceleration level and a second acceleration level. The tilt calculator 22 comprises instructions or a software module for determining final tilt angle based on an arcsine tilt equation or an arccosine tilt equation.

A data port 26 is coupled to the data bus 28 and a vehicle data bus 34. In turn, the vehicle data bus 34 is coupled to a vehicle controller 36. The vehicle data bus 34 and the vehicle controller 36 are shown as dashed lines because they are optional; may not be present on all vehicles on which the tilt sensor 11 is used. The data bus 28 and the vehicle controller 36 may receive and process a tilt or final tilt determined by the tilt sensor 11 or tilt data processing system.

The data processor 30 generally comprises a microprocessor, a microcontroller, a digital signal processor, an application specific integrated circuit, a logic circuit, an arithmetic logic unit, a programmable logic array, or another data processing device.

The data storage device 18 generally comprises electronic memory, random access memory, non-volatile random access memory, electronic data storage, optical data storage device, a magnetic data storage device, or another device for storing digital or analog data. The data storage device 18 may store program instructions or software modules for execution by the data processor 30. For example, the data storage device 18 may store a filter 20, a tilt calculator 22 and a selector 24 as program instructions or software modules. The data storage device 18 facilitates storing and retrieving of any of the following: measured first acceleration levels, measured second acceleration levels, acceleration data (e.g., measured in two or more dimensions along the axes), time stamps associated with corresponding acceleration data, respective time stamps associated with measured first acceleration levels, respective time stamps associated with measured second acceleration levels, tilt equations, an arcsine-derived tilt equation, and an arccosine-derived tilt equation.

Figure 3:
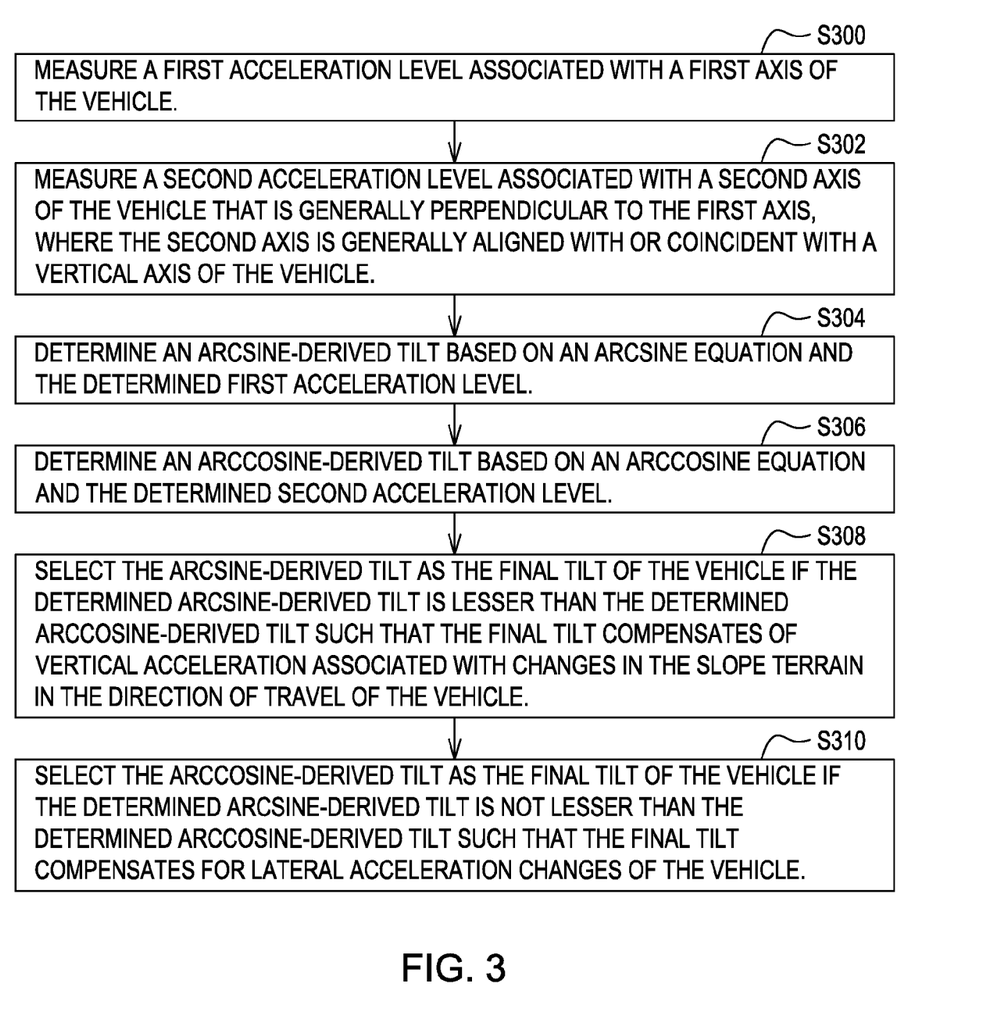
FIG. 3 is a flow chart of one embodiment of a method for determining a tilt of a vehicle.

FIG. 3 is a flow chart of one embodiment of a method for determining a tilt (e.g., tilt angle) of a vehicle 95. The method of FIG. 3 begins in step S300.

In step S300, a first accelerometer 10 measures a first acceleration level associated with a first axis of the vehicle 95. For example, the first accelerometer 10 may be aligned to indicate acceleration (e.g., in magnitude and direction) associated with the X-axis 100 or the Y-axis 103 of the vehicle 95 as the first axis. For instance, the first axis comprises the X-axis 100 or the Y-axis 103 of the vehicle 95. In one embodiment as illustrated in FIG. 1, the first axis comprises the X-axis 100, where the X-axis 100 is primarily coincident with a direction of forward travel of the vehicle 95 and where the Y-axis 103 is primarily coincident with a direction of lateral movement of the vehicle 95.

In an alternate embodiment of step S300, a first accelerometer 10 measures a first acceleration level associated with a first axis of the vehicle 95 and a second accelerometer 13 measures a third acceleration level associated with a third axis of the vehicle 95. The third axis is generally perpendicular to the first axis and the second axis. For example, the first accelerometer 10 may be aligned to indicate acceleration (e.g., in magnitude and direction) associated with the X-axis 100 and the third accelerometer 13 may be aligned to indicate acceleration associated with the Y-axis 103, or vice versa. If the first axis comprises the X-axis 100, then the third axis comprises the Y-axis 103, and vice versa. In one embodiment as illustrated in FIG. 1, the X-axis 100 is primarily coincident with a direction of forward travel of the vehicle 95 and the Y-axis 103 is primarily coincident with a direction of lateral movement of the vehicle 95.

Under one possible technique for executing step S300, the data processor 30 or averaging module 21 filters or averages the first acceleration level over an averaging period or sliding window prior to the determining of the arcsine-derived tilt in later steps.

In step S302, a second accelerometer 12 measures a second acceleration level associated with a second axis of the vehicle 95 that is generally perpendicular to the first axis. For example, the second accelerometer 12 may be aligned to indicate acceleration (e.g., in magnitude and direction) along the second axis that is generally aligned with or coincident with a Z-axis 101 or vertical axis of the vehicle 95. For instance, the second axis comprises the Z-axis 101, where the first axis comprises the X-axis 100 or Y-axis 103 of the vehicle 95. In practice, the first accelerometer 10 and the second accelerometer 12 are housed in a common housing or enclosure such that the first axis and the second axis are fixed in a generally perpendicular orientation with respect to each other. Further, the housing is oriented along the proper axis of the vehicle 95 such that the second accelerometer 12 is substantially aligned with the vertical axis or Z-axis 101 of the vehicle 95.

Under one possible technique for executing step S302, the data processor 30 or averaging module 21 filters or averages the second acceleration level over an averaging period or sliding window prior to the determining of the arccosine-derived tilt in later steps.

In step S304, a data processor 30, an arithmetic logic unit or the tilt calculator 22 determines an arcsine-derived tilt based on an arcsine equation and the determined first acceleration level. In one configuration, the arcsine-derived tilt has greater sensitivity to changes in tilt around zero degrees, or zero degrees plus or minus approximately five degrees, than the arccosine-derived tilt. Step S304 may be carried out by various techniques that may be applied alternately or cumulatively. Under a first technique, the arsine-derived tilt or arcsine equation comprises: $T_{ASY}$=arcsine ($A_Y$), where $T_{AS}$ is the arcsine-derived tilt angle and $A_Y$ is the measured Y-axis 103 acceleration (e.g., the measured first acceleration level or third acceleration level). Under the first technique, the first accelerometer 10 is aligned to measure or detect acceleration (e.g., linear acceleration) along or in the direction of the Y-axis 103.

Under a second technique, the arcsine-derived tilt or arcsine equation comprises: $T_{ASX}$=arcsine ($A_X$), where $T_{AS}$ is the arcsine-derived tilt angle and $A_X$ is the measured X-axis 100 acceleration or the measured first acceleration level. Under the first technique, the first accelerometer 10 is aligned to measure or detect acceleration (e.g., linear acceleration) along or in the direction of the X-axis 100.

Under a third technique, the arcsine equation uses a weighted average, equal weighted averaged, or composite measurement, where $T_{CAS}$=($W_Y$arcsine($A_Y$)+$W_X$arcsine($A_X$))/2, where $T_{CAS}$ is the composite arcsine-derived tilt angle; $A_Y$ is the measured Y-axis 103 acceleration; $A_X$ is the measured X-axis 100 acceleration; $W_Y$ is the weighting factor for Y-axis 103 acceleration and $W_x$ is the weighting factor for the X-axis 100 acceleration, where $W_Y$+$W_x$=1. The third technique requires at least two accelerometers in the tilt sensor (e.g., 11), where a primary accelerometer is dedicated to the X-axis and secondary accelerometer is dedicated to the Y-axis, and where a tertiary accelerometer is optionally dedicated to the Z-axis. $T_{CAS}$, the composite arcsine-derived tilt, is based on measurements (e.g., first acceleration level and third acceleration level) of accelerometers (10, 13) oriented along different axes (e.g., X-axis and Y-axis).

Under a fourth technique, the arcsine equation comprises: $T_{XY}=\arcsin\sqrt{A_x^2+A_y^2}$, where $T_{XY}$ is the two-axis, arcsine-derived tilt angle; $A_Y$ is the measured Y-axis 103 acceleration; $A_X$ is the measured X-axis 100 acceleration. $T_{XY}$, the two-axis, arcsine-derived tilt, is based on measurements (e.g., first acceleration level and third acceleration level) of accelerometers (10,13) oriented along different axes (e.g., X-axis and Y-axis). $T_{XY}$ provides more accurate estimates of tilt than $T_{ASY}$ (e.g., the first technique) or $T_{ASX}$ (e.g., the second technique) over a greater angular range and without any angular ambiguity that might otherwise result from a sine function-determined tilt with reference to one-axis.

In step S306, the data processor 30, an arithmetic logic unit, or the tilt calculator 22 is configured to determine an arc-cosine-derived tilt based on an arccosine equation and the determined second acceleration level. Step S306 may be carried out by various procedures that may be applied alternately or cumulatively. Under a first procedure, the data processor 30 uses the following arccosine equation: $T_{AC}=\arccos(A_Z)$, where $T_{AC}$ is the arccosine-derived tilt angle and $A_Z$ is the Z-axis 101 acceleration or the measured second acceleration level. Under a second procedure, the data processor 30 or tilt calculator 22 determines the arccosine-derived tilt based on an arccosine equation and the determined second acceleration level further comprises setting the arccosine to zero if the arccosine numerator is greater than an acceleration of 1 G. Under the first and second techniques, the second accelerometer 12 is aligned to measure or detect acceleration (e.g., linear acceleration) along or in the direction of the X-axis 100.

In step S308, the data processor 30 or selector 24 selects the arcsine-derived tilt as the final tilt of the vehicle 95 if the determined arcsine-derived tilt is lesser than the determined arccosine-derived tilt such that the final tilt compensates for vertical acceleration associated with changes in the slope terrain in the direction of travel of the vehicle 95. For example, the arcsine-derived tilt may comprise $T_{ASX}$, $T_{ASY}$, $T_{CAS}$, or $T_{XY}$, consistent with the above referenced equations, whereas the arccosine-derived tilt may comprise $T_{AC}$. The data processor 30 or selector 24 may select the arcsine-derived tilt to reduce the impact of traveling over sloped terrain, rough terrain or bumpy terrain, where transient fluctuations in vertical acceleration may occur.

In step S310, the data processor 30 or the selector 24 selects the arccosine-derived tilt as the final tilt of the vehicle 95 if the determined arsine-derived tilt is not lesser than the determined arccosine derived tilt such that the final tilt such that the final tilt compensates for lateral acceleration changes of the vehicle 95. The data processor 30 or selector 24 may select the arccosine-derived tilt to reduce the impact of lateral acceleration, such as braking, stopping or turning of the vehicle 95. Although the measuring of the first acceleration level and the second acceleration level in steps S300 and S302 is accomplished during a sampling interval at a sampling rate (e.g., approximately 5 to 40 milliseconds), in step S310 the data processor 30 or selector 24 selects the final tilt such that it may change between adjacent calculation intervals, where each calculation interval has a greater duration than the sampling interval.

Advantageously, for each sampling interval or a longer calculation period, the selector 24 dynamically and continuously selects a final tilt from the arcsine-derived tilt and the arccosine-derived tilt to compensate for transient lateral and vertical acceleration of the vehicle 95 that is predominately experienced during the sampling interval or the calculation interval (e.g., greater in duration than the sampling interval). During operation of the vehicle 95, the tilt sensor 11 may alternate between the arcsine-derived tilt and arccosine-derived tilt to achieve accurate tilt angles during or immediately after turning, braking, traversing bumpy terrain, or traversing sloped terrain. If both vertical and lateral transient acceleration are experienced simultaneously (e.g., braking while descending sloped terrain), the data processor 30, averaging module 21, or selector 24 may apply one or more of the following: (1) time-averaging or weighted averaging to increase maintain the accuracy and the reliability of the final tilt angle, and (2) empirical tests or tilt measures to calibrate weighting factors for contribution of the arcsine-derived tilt and arccosine-derived tilt to achieve accurate tilt angles in the presence of vertical and lateral transient acceleration.

Figure 4:
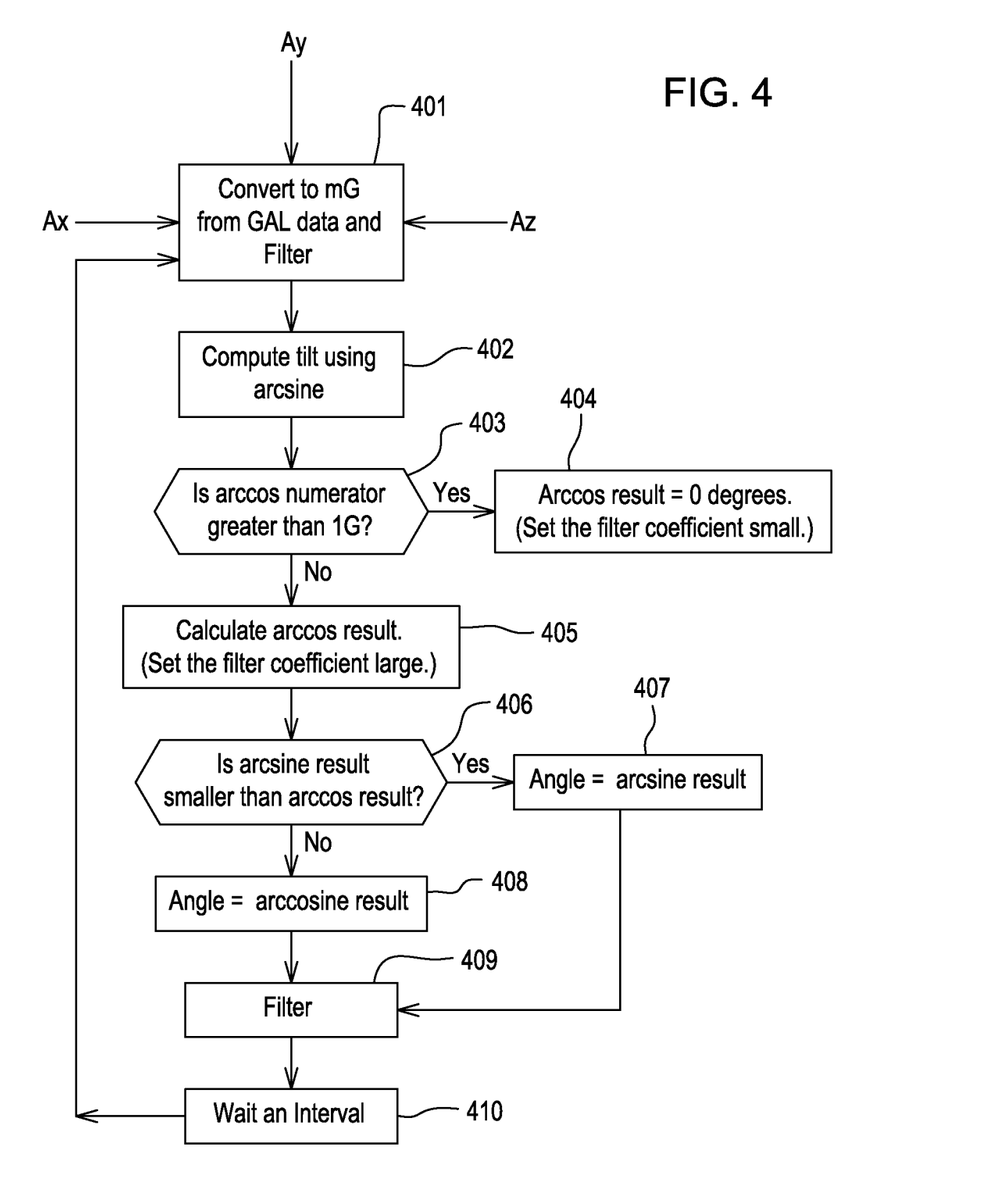
FIG. 4 is a flow chart of another embodiment of a method for determining the tilt of a vehicle.

FIG. 4 is a flow chart of another embodiment of a method for determining a tilt of a vehicle 95. The method of FIG. 4 begins in block 401.

One or more accelerometers provide acceleration data in three dimensions as input to the conversion process of block 401. The accelerometers are aligned to measure acceleration with reference to three orthogonal axes, X-axis 100, the Y-axis 103 and Z-axis 101. For example, measured acceleration data is $A_x$ for the X-axis 100, $A_y$ for the Y-axis 103 and $A_z$ for the Z-axis 101. The acceleration data may be supplied in any unit of acceleration. For example, the acceleration data may be supplied as Milligal units or Gal units. The Gal may be referred to as the galileo and is a unit of acceleration that is defined as 1 centimeter per second squared (1 cm/s$^2$).

In block 401, the data processor 30 or filter 20 converts acceleration data from Gal units or Milligal units to G units and filter 20s. G units of acceleration are equivalent to approximately 9.81 meters per second squared (9.81 m/s$^2$), 980.66 Gal, or 980660 Milligal. In step S401, the filter 20 may comprise a low pass digital filter that reduces high frequency noise in the measured acceleration data from the first accelerometer 10 and the second accelerometer 12, for instance.

In addition to the low pass filtering, the averaging module 21 (e.g., integrator) may transform, integrate or statistically process inputted acceleration data into outputted average acceleration data over a sampling period or other time interval, which may comprise a sliding window.

In block 402, the data processor 30 or tilt calculator 22 determines an arcsine-derived tilt using an arcsine equation and the averaged or filtered 20 acceleration data of block 401.

In block 403, the data processor 30 looks at the averaged or filtered acceleration data for the Z-axis 101 or A. The data processor 30 determines whether $A_z$ is greater than 1 G, a Gal or gravity. $A_z$ may also be referred to as the arccosine numerator of the following equation: $T_{AC}=\arccos(A_z/1\ G)$, where $T_{AC}$ is the arccosine-derived tilt, $A_z$ is the acceleration along the Z-axis 101 or vertical axis of the vehicle 95 and 1 G is a single Gal or galileo. If Z is greater than 1 G, then the method continues with block 404. However, if Z is less than or equal to 1 G, then the method continues with block 405.

In block 404, the data processor 30 or the tilt calculator 22 sets $T_{AC}$ equal to zero degrees tilt. $T_{AC}$ or the arc-cosine result is set equal to zero degrees tilt and the filter coefficient of the filter 20 is set to a small filter coefficient, for example. The vertical acceleration may become greater than 1 G when the vehicle is traversing bumps on generally level ground (e.g., a generally planar area without a material incline) or when approaching a valley, for instance. The arccosine can be set equal to zero when the vehicle is operating on approximately level terrain, or when approaching a valley.

In block 405, the data processor 30 or the tilt calculator 22 determines the arccosine-derived tilt based on execution of the following equation: $T_{AC}$=arccosine($A_z$/1 G), where $T_{AC}$ is the arccosine-derived tilt, $A_z$ is the acceleration along the Z-axis 101 or vertical axis of the vehicle 95 and 1 G is a single Gal or galileo. For example, $T_{AC}$ is stored in the data storage device 18 or in registers of the data processor 30 and the filter coefficient of the filter 20 is set to large.

In block 406, the data processor 30 or the selector 24 compares the arcsine-derived tilt to the arccosine-derived tilt. If the data processor 30 or selector 24 determines that the arcsine-derived tilt is lesser than the arccosine derived tilt, the method continues in block 407. However, if the data processor 30 determines that the arcsine result is not smaller than the arccosine-derived tilt, the method continues with block 408.

In block 407, the data processor 30 or the selector 24 selects, identifies, or designates the arcsine-derived tilt (e.g., $T_{XY}$) as the final tilt. In one example, the final tilt is stored in the data storage device 18 as tilt angle for a corresponding sampling interval or data processing interval of the data processor 30. In another example, the final tilt is transmitted to a vehicle controller 36 via a vehicle data bus 34 for further action.

In block 408, the data processor 30 or the selector 24 selects, identifies, or designates the arccosine-derived tilt as the final tilt. In one example, the final tilt is stored in the data storage device 18 as tilt angle for a corresponding sampling interval or data processing interval of the data processor 30.

In block 409, the filter 20 or data processor 30 may filter 20 the final tilt with a low pass filter response to remove high frequency noise associated with the processing in the data processor 30 or from electromagnetic interference that would otherwise be introduced into the final tilt angle. The averaging module 21 averages, integrates or statistically processes the final tilt angle to smooth or eliminate the effects of transient acceleration measurements on the final tilt that might otherwise detract from reliability or accuracy of the final tilt. Prior to, during, or after execution of block 409, in one embodiment the data port 26 or data processor 30 transmits final tilt to a vehicle controller 36 via a vehicle data bus 34 for further action. The vehicle controller 36 may use the final tilt angle to make decisions about suspension control (e.g., adding compressed air or nitrogen to charge shock absorbers on one side of the vehicle 95 to enhance stability), braking control (e.g., applying anti-lock or traction-control braking system to one side of the vehicle 95 or one or more wheels to enhance stability), or safety system deployment (e.g., turning off engine or blade of a mower or the power take-off (PTO) shaft of a tractor in preparation for a roll-over).

In block 410, the data processor 30 may wait an interval or sampling period prior to collecting additional acceleration data for processing in accordance with block 401 and the successive blocks, as previously described. Prior to continuing with block 410 or in block 410, the data processor 30 may be programmed with a watchdog program or other supervisory software instructions to interrupt, continue, end, or reset the process of FIG. 4 for any logical reason or proper operation of the vehicle 95 and its data processing and control systems and software.

The tilt sensor 11 and method described in this document is well-suited for improving the measured accuracy and reliability of measured tilt angle when a vehicle 95 is traversing sloped terrain (e.g., traveling downhill on a continuous slope of greater than 10 degrees). The tilt sensor 11 and method described in this document is capable of compensating for the distortion in measured acceleration from gravity; hence, determined tilt of the vehicle 95, when traversing sloped terrain, for example.

The tilt sensor 11 and method described in this document is well-suited for improving the measured accuracy and reliability of measured tilt angle when a vehicle 95 is traversing rough, bumpy off-road terrain or on-road terrain. The tilt sensor 11 and method described in this document is capable of compensating for the distortion in measured acceleration from gravity and interaction with rough or bumpy ground surfaces; hence, determined tilt of the vehicle 95, when traversing rough, bumpy terrain, for example.

The tilt sensor 11 and method described in this document is well-suited for improving the measured accuracy and reliability of measured tilt angle when a vehicle 95 operates off-road for mining, construction, forestry, agriculture, and other similar applications.

The tilt sensor 11 and method described in this document is capable of compensating for the distortion in measured acceleration from rapid braking, abrupt stopping, or any deceleration that approaches or exceeds approximately 1 Gal or galileo; hence, determined tilt of the vehicle 95, when slowing or stopping a vehicle 95, for example.

The tilt sensor 11 and method described in this document is well-suited for improving the measured accuracy and reliability of measured tilt angle when a vehicle 95 is turning sharply or is turning over greater than a threshold angular range of steering or heading angles within a time period (e.g., executing a U-turn, a key-hole turn pattern, a slalom path, or any turn to reverse the direction of travel of the vehicle 95 at the end of the row of a field or work area). The tilt sensor 11 and method described in this document is capable of compensating for the distortion in measured acceleration from sharp turns, U-turns, or reversals in direction, or any turning that approaches or exceeds approximately 1 Gal or galileo; hence, determined tilt of the vehicle 95, when turning or steering, for example.

Having described the preferred embodiment, it will become apparent that various modifications can be made without departing from the scope of the invention as defined in the accompanying claims.

The invention claimed is:

1. A method for determining the tilt of a vehicle, the method comprising:
measuring a first acceleration level associated with a first axis of the vehicle;
measuring a second acceleration level associated with a second axis of the vehicle that is generally perpendicular to the first axis, the second axis generally aligned with or coincident with a vertical axis of the vehicle;
determining, by a processor, an arcsine-derived tilt based on an arcsine equation and the determined first acceleration level;
determining, by a processor, an arc-cosine-derived tilt based on an arccosine equation and the determined second acceleration level;
selecting, by a processor, the arcsine-derived tilt as the final tilt of the vehicle if the determined arc sine-derived tilt is lesser than the determined arccosine derived tilt such that the final tilt compensates for vertical acceleration associated with changes in the slope terrain in the direction of travel of the vehicle; and
selecting, by a processor, the arccosine-derived tilt as the final tilt of the vehicle if the determined arcsine-derived tilt is not lesser than the determined arccosine derived tilt such that the final tilt compensates for lateral acceleration changes of the vehicle.

2. The method according to claim 1, wherein, the first axis comprises the X-axis or the Y-axis of the vehicle and the second axis comprises the Z-axis of the vehicle.

3. The method according to claim 1, wherein $T_{ASY}$=arcsine $(A_Y)$, where $T_{ASY}$ is the arcsine-derived tilt angle and $A_Y$ is the measured Y-axis acceleration or the measured first acceleration level.

4. The method according to claim 1, wherein $T_{ASX}$=arcsine $(A_X)$, where $T_{ASX}$ is the arcsine-derived tilt angle and $A_X$ is the measured X-axis acceleration or the measured first acceleration level.

5. The method according to claim 1, wherein $T_{AC}$=arccosine $(A_z)$, where $T_{AC}$ is the arccosine-derived tilt angle and $A_Z$ is the Z-axis acceleration or the measured second acceleration level.

6. The method according to claim 1, wherein the measuring of the first acceleration level and the second acceleration level is accomplished during a sampling interval at a sampling rate, such that the selecting of the final tilt may change between adjacent calculation intervals, where each calculation interval has a greater duration than the sampling interval.

7. The method according to claim 1, wherein the measuring of the first acceleration level and the second acceleration level are filtered or averaged over an averaging period or sliding window prior to the determining of the arc sine-derived tilt and the arccosine-derived tilt.

8. The method according to claim 1, wherein determining the arc-cosine-derived tilt based on an arccosine equation and the determined second acceleration level further comprises setting the arccosine to zero if the arccosine numerator is greater than an acceleration of 1 G.

9. The method according to claim 1, further comprising:
measuring a third acceleration level associated with a third axis of the vehicle that is generally perpendicular to the first axis and the second axis of the vehicle; and
determining the arcsine-derived tilt based on the arcsine equation and the determined first acceleration level and the determined third acceleration level.

10. The method according to claim 9 wherein the arcsine-derived tilt comprises $T_{XY}$, which is the two-axis, arcsine-derived tilt angle, determined in accordance with the following equation:
$T_{XY}$=arcsin$\sqrt{A_X^2+A_Y^2}$, where $A_X$ is a measured X-axis acceleration or the first acceleration level, where $A_Y$ is a measured Y-axis acceleration or the third acceleration level.

11. A system for determining the tilt of a vehicle, the system comprising:
a first accelerometer for measuring a first acceleration level associated with a first axis of the vehicle;
a second accelerometer for measuring a second acceleration level associated with a second axis of the vehicle that is generally perpendicular to the first axis, the second axis generally aligned with or coincident with a vertical axis of the vehicle;
a data processor for determining an arc sine-derived tilt based on an arcsine equation and the determined first acceleration level, the data processor configured to determine an arc-cosine-derived tilt based on an arccosine equation and the determined second acceleration level;
the data processor comprising a selector for selecting the arc sine-derived tilt as the final tilt of the vehicle if the determined arc sine-derived tilt is lesser than the determined arccosine derived tilt such that the final tilt compensates for vertical acceleration associated with changes in the slope terrain in the direction of travel of the vehicle; and
the selector configured to select the arccosine-derived tilt as the final tilt of the vehicle if the determined arsine-derived tilt is not lesser than the determined arccosine derived tilt such that the final tilt compensates for lateral acceleration changes of the vehicle.

12. The system according to claim 11, wherein, the first axis comprises the X-axis or the Y-axis of the vehicle and the second axis comprises the Z-axis of the vehicle.

13. The system according to claim 11, wherein the arc-sine tilt is determined in accordance with the following equation:
$T_{ASY}$=arcsine $(A_Y)$, where $T_{ASY}$ is the arc sine-derived tilt angle and $A_Y$ is the measured Y-axis acceleration or the measured first acceleration level.

14. The system according to claim 11 wherein the arc-sine derived tilt is determined in accordance with the following equation:
$T_{ASX}$=arcsine $(A_X)$, where $T_{ASX}$ is the arcsine-derived tilt angle and $A_X$ is the measured X-axis acceleration or the measured first acceleration level.

15. The system according to claim 11 wherein the arc-cosine-derived tilt is determined in accordance with the following equation:
$T_{AC}$=arccosine $(A_Z)$, where $T_{AC}$ is the arccosine-derived tilt angle and $A_Z$ is the Z-axis acceleration or the measured second acceleration level.

16. The system according to claim 11 wherein the first accelerometer is configured to measure the first acceleration level and second accelerometer is configured to measure the second acceleration level during a sampling interval at a sampling rate, such that the selecting of the final tilt may change between adjacent calculation intervals of the data processor, where each calculation interval has a greater duration than the sampling interval.

17. The system according to claim 11 wherein the first accelerometer is adapted to filter or average the first acceleration level and the second acceleration level over an averaging period or sliding window prior to the determining of the arcsine-derived tilt and the arccosine-derived tilt.

18. The system according to claim 11 wherein data processor determines the arc-cosine-derived tilt by setting the arccosine to zero if the arccosine numerator is greater than an acceleration of 1 G.

19. The system according to claim 11 further comprising:
a third accelerometer for measuring a third acceleration level associated with a third axis of the vehicle that is generally perpendicular to the first axis and the second axis;
where the arcsine-derived tilt is determined in accordance with the following equation:
$T_{CAS}$=$(W_Y$arcsine $(A_Y)+W_X$arcsine $(A_X))/2$, $T_{CAS}$ is the arc sine-derived tilt; $A_Y$ is the measured Y-axis acceleration or third acceleration level; $A_X$ is the measured X-axis acceleration or first acceleration level; $W_Y$ is the weighting factor for Y-axis acceleration; $W_X$ is the weighting factor for the X-axis acceleration; and $W_Y+W_X=1$.

20. The system according to claim 11 further comprising:
a third accelerometer for measuring a third acceleration level associated with a third axis of the vehicle that is generally perpendicular to the first axis and the second axis of the vehicle;

where the arcsine-derived tilt comprises $T_{XY}$, which is the two-axis, arcsine-derived tilt angle, in accordance with the following equation:

$T_{XY} = \arcsin\sqrt{A_X^2 + A_Y^2}$, where $A_X$ is a measured X-axis acceleration or first Acceleration level, where $A_Y$ is a measured Y-axis acceleration or second acceleration level.

21. A method for determining the tilt of a vehicle, the method comprising:
measuring a first acceleration level associated with a first axis of the vehicle;
measuring a second acceleration level associated with a second axis of the vehicle that is generally perpendicular to the first axis, the second axis generally aligned with or coincident with a vertical axis of the vehicle;
measuring a third acceleration level associated with a third axis of the vehicle that is generally perpendicular to the first axis and the second axis of the vehicle;
determining, by a processor, an arcsine-derived tilt based on an arcsine equation and the determined first acceleration level and the determined third acceleration level;
determining, by a processor, an arc-cosine-derived tilt based on an arccosine equation and the determined second acceleration level;
selecting, by a processor, the arcsine-derived tilt as the final tilt of the vehicle if the determined arc sine-derived tilt is lesser than the determined arccosine derived tilt such that the final tilt compensates for vertical acceleration associated with changes in the slope terrain in the direction of travel of the vehicle; and
selecting, by a processor, the arccosine-derived tilt as the final tilt of the vehicle if the determined arcsine-derived tilt is not lesser than the determined arccosine derived tilt such that the final tilt compensates for lateral acceleration changes of the vehicle.

22. The method according to claim 21, wherein arc sine-derived tilt comprises $T_{XY}$, which is the two-axis, arcsine-derived tilt angle determined in accordance with the following equation:

$T_{XY} = \arcsin\sqrt{A_X^2 + A_Y^2}$, where $A_Y$ is a measured third axis acceleration level along the Y-axis and $A_X$ is the measured first axis acceleration level along the X-axis.

23. The method according to claim 21, wherein the arcsine-derived tilt is determined in accordance with the following equation:

$T_{CAS} = (W_Y \arcsin(A_Y) + W_X \arcsin(A_X))/2$, $T_{CAS}$ is the arcsine-derived tilt; $A_Y$ is the measured Y-axis acceleration or the third acceleration level; $A_X$ is the measured X-axis acceleration or the first acceleration level; $W_Y$ is the weighting factor for Y-axis acceleration;
$W_X$ is the weighting factor for the X-axis acceleration; and $W_Y + W_X = 1$.

24. The method according to claim 21, wherein the arcsine-derived tilt is determined in accordance with the following equation:

$T_{XY} = \arcsin\sqrt{A_X^2 + A_Y^2}$, where $T_{XY}$ is the two-axis, arcsine-derived tilt angle; $A_Y$ is the measured Y-axis acceleration or third acceleration level; $A_X$ is the measured X-axis acceleration or first acceleration level.

* * * * *